3,067,093
INSECT COMBATTING AGENT

Lyle D. Goodhue, Bartlesville, Kenneth E. Cantrel, Dewey, and Rector P. Louthan, Bartlesville, Okla., assignors to Phillips Petroleum Company, a corporation of Delaware
No Drawing. Filed Dec. 7, 1960, Ser. No. 74,216
11 Claims. (Cl. 167—30)

This invention relates to the combatting of insects. In one of its aspects, the invention provides novel insect combatting agents consisting essentially of sulfoxides of the formulas

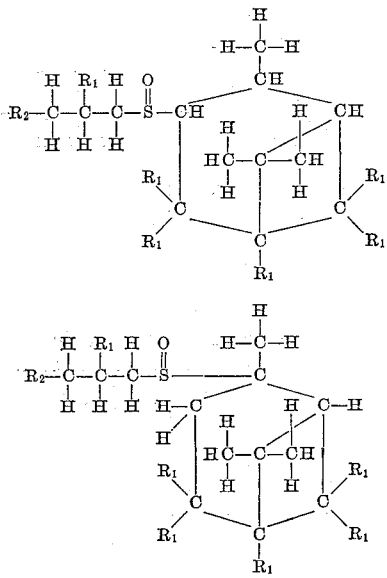

wherein $R_1$ is selected from the group consisting of hydrogen and methyl, and $R_2$ is selected from the group consisting of hydrogen and chlorine. In another of its aspects, the invention relates to the repelling of insects, especially flies, roaches, and mosquitoes, etc., using a repellent consisting essentially of one of the aforesaid compounds.

The compounds herein discussed are execellent repellents for house and stable flies (*Musca domestica* and *Stomoxys calcitrans*). Indeed, the herein discussed sulfoxides have been found to be outstanding as repellents, especially for flies, roaches, and mosquitoes. This is particularly surprising since dimethyl-, tert-butyl ethyl-, di-n-propyl-, diisobutyl-, tert-butyl n-butyl-, di-n-heptyl- and tert-octyl methyl sulfoxides possess little or no real repellency toward houseflies rendering these sulfoxides of no practical value as repellents for houseflies. Data showing the ineffectiveness of these sulfoxides as repellents are found in run Nos. 19–25 in Table IV, U.S. Patent 2,957,799, issued October 25, 1960, to Lyle D. Goodhue, Roy E. Stansbury and Rector P. Louthan. This patent also contains additional data in Table VI showing ineffectiveness of certain of these sulfoxides as stable fly repellents. Further, it is noted that the corresponding sulfides, while generally possessing some potency, are far less effective than the sulfoxides.

For many conditions, a repellent for insects is more desirable than a combatting agent which leads to knockdown or kill. For example, it is generally more desirable to repel insects from a table or counter on which food is placed since contamination of the food with dead insects is avoided. Use of the compounds herein disclosed for such purposes can minimize contamination and the unsightly presence of dead or paralyzed insects. The compounds and compositions herein disclosed have many attributes and have wide-spread utility.

It is an object of the present invention to provide an insect combatting agent. It is another object of the present invention to provide a method of combatting insects, especially flies, roaches and mosquitoes. It is a further object of the present invention to provide an insect repellent. A further object still is to provide a fly repellent. More specifically, it is an object of the present invention to provide a house fly repellent. A further object is to provide a roach and/or mosquito repellent. Still another object is to provide a method of repelling house flies. Another object is to provide a method for repelling roaches and/or mosquitoes.

Other aspects, objects and the several advantages of the invention are apparent from this disclosure and the appended claims.

According to the present invention, there is provided an insect combatting agent consisting essentially of a sulfoxide as herein defined. Also, according to the present invention, there is provided a method for combatting an insect by subjecting said insect to the action of a repellent consisting essentially of a sulfoxide as herein defined.

Further, and more specifically, according to the present invention there is provided a method of repelling a fly from an animal by subjecting said animal to an application of at least one sulfoxide as defined herein in an amount to render said animal repellent to flies, especially house and/or stable flies. Similarly, the same treatment will result in rendering said animal repellent to mosquitoes and the like.

Also, according to the invention, there is provided an ingredient, consisting essentially of one of the sulfoxides herein defined, especially adapted for admixture with at least one other insect combatting material or compound.

One of the problems facing the researcher today is that, although many insect combatting agents are known or suggested, few, if any, satisfy the now stringent tests which determine whether a material is an acceptable combatting agent. The problem is not to find just another material exhibiting combatting properties but rather is to find a material possessing the kind of combatting properties rendering it acceptable in the art to which it pertains as a marketable material. The compounds of the present invention, unlike certain other sulfoxides and their corresponding sulfides, are outstanding repellents.

Examples of sulfoxides which have the above-described structures are illustrated by the following compounds:

n-Propyl 2-pinyl sulfoxide
3-chloropropyl 2-pinyl sulfoxide
3-chloropropyl 3-pinyl sulfoxide
2-methylpropyl 3-pinyl sulfoxide
2-methylpropyl 2-pinyl sulfoxide
2-methyl-3-chloropropyl 3-pinyl sulfoxide
2-methyl-3-chloropropyl 2-pinyl sulfoxide
3-chloropropyl 2-(5-methylpinyl)sulfoxide
2-methyl-3-chloropropyl 3-(4,5-dimethylpinyl)sulfoxide
3-chloropropyl 2-(6-methylpinyl)sulfoxide
2-methylpropyl 2-(4,4-dimethylpinyl)sulfoxide
3-chloropropyl 3-(4,4,5,6,6-pentamethylpinyl)sulfoxide and the like.

Various means are known for the preparation of these sulfoxides. One convenient method involves oxidation of the corresponding sulfides. The reaction can be carried out in an organic solvent medium; such as acetic acid, acetone or methanol. A near theoretical amount of oxidizing agent is added to the reaction mixture, preferably at temperatures in the range of about 0° to 200° C. Commonly hydrogen peroxide is employed as an oxidizing agent; however, other reagents, such as the peracids, nitric acid, chromic acid, and potassium permanganate, are employed. The sulfoxide can be recovered from the reaction mixture, commonly by dissolving or extracting in a suitable solvent, and purified by crystallization.

As noted, the compounds herein disclosed are highly effective as insect repellents and especially as repellents for flies, roaches, mosquitoes, etc. For application, the pure compounds can be employed. However, for better overall results including convenience and economy, these compounds are frequently applied by brushing or spraying dilute solutions. Suitable solvents include naphthas, kerosenes and particularly deodorized kerosene, toluene, xylene, cyclohexanone, acetone, and isoparaffinic hydrocarbon solvents such as sold under the trade name of Soltrol. The solutions prepared with these liquids can be conveniently applied as space sprays. The sprays can be readily dispensed from aerosol type bombs pressurized with a suitable propellant. These solutions can contain emulsifiers so that upon dilution with water an oil-in-water or a water-in-oil emulsion is formed. These emulsions can be brushed or sprayed. The nonionic emulsifiers, such as the condensation products of ethylene oxide with nonyl phenol, e.g., Triton X–100, are especially suitable but there are many suitable emulsifiers. These compounds can also be blended with waxes to form a polish having insect-repelling properties. For some applications, these compounds are blended with or sorbed on clays or other powdery materials which can be blown into the atmosphere. Wettable dusts or powders, comprising these sulfoxides, can also be manufactured.

For most applications the formulation contains one or more of the sulfoxides in an amount within the range between 0.01 and 5 grams deposited on each square foot of surface from which insects are to be repelled, preferably from 0.1 to 3 grams per square foot of surface are deposited. The repellents of this invention can be present in the solution, emulsion, dust, etc. in the range of 0.3 to 30 percent by weight whenever a carrier material is used. Preferably, the repellents will be present between the range of 0.5 and 15 percent by weight. By use of the proper propellant, solutions containing compounds of this invention can be aerosol dispersed. These repellents are effective when employed in very small amounts. Surfaces of various kinds which are brushed or sprayed, so as to have distributed thereon a coating of one of these sulfoxides, are highly repellent toward insects.

For many applications these sulfoxides can be the sole insect combatting agent in the formulation. For other applications the formulation can comprise one or more of the sulfoxides with one or more other well-known insect combatting agents. An enhanced effect is obtained by the use of combination of reagents.

The examples illustrate the preparation of the sulfoxide herein disclosed and their value as insect combatting agents.

PREPARATION OF ALKYL AND 3-CHLOROALKYL PINYL SULFOXIDES

Alkyl and 3-chloroalkyl pinyl sulfoxides can be prepared by first reacting 2- or 3-pinyl mercaptan with sodium hydroxide, using a solvent such as methanol, ethanol, propanol or acetone, to form the alkali metal mercaptide. The mercaptides are then reacted with a suitable alkyl halide such as propyl chloride to form propyl pinyl sulfide or with a dihalide such as 1-bromo-3-chloropropane to form 3-chloropropyl pinyl sulfide. Oxidation of these sulfides to the corresponding sulfoxides is then carried out. The preferred oxidizing agents are peroxygen compounds selected from the group consisting of hydrogen peroxide and organic peracids of low molecular weight. Examples of suitable organic peracids are performic acid, peracetic acid and perbenzoic acid. The mole ratio of the oxidizing agent to the sulfide is between the range of 0.5:1 to 1.5:1, preferably between the range of 0.8:1 to 1:1. The oxidizing process is carried out in the liquid state by the addition of the peroxygen compound to the sulfide dissolved in a material which is also a solvent for the peroxygen compound. Some examples of suitable solvents are methanol, ethanol, isopropanol and acetone. The sulfoxides are oxidized at a temperature within the range of 0 to 100° C., preferably from 50 to 80° C. and the reaction times are usually less than one hour. To avoid the loss of sulfoxide through formation of sulfone, it is desirable to keep the sulfide compound in excess of the peroxygen compound. The determination of the end of the reaction can be conveniently made by the use of lead sulfide paper. It has been found that the lead sulfide test is more sensitive than potassium iodide-starch paper.

An alternative method for oxidizing these sulfides is to oxidize the sulfide with oxygen or an oxygen-containing gas such as air in the presence of a small amount of $NO_2$ or concentrated nitric acid plus a bromine-containing compound as set forth in U.S. 2,859,248 of Rector P. Louthen, issued November 4, 1958.

For many applications, these sulfoxides can be the sole insect combatting agent in the formulation. For other applications, the formulation can comprise one or more of the sulfoxides with one or more other well-known insect combatting agents.

The examples illustrate the preparation and effectiveness of the new and novel compositions of this invention.

Example I.—Preparation of 3-Pinyl Mercaptan 3-pinyl mercaptan was prepared by reacting 272 g. alpha-pinene (2 moles), with 74 g. hydrogen sulfide (2 moles) in the presence of 4 cc. trimethyl phosphite for 90 minutes in a 500 cc. stainless steel reactor at a temperature ranging from 62 to 85° F. and at a pressure ranging from 121 to 198 p.s.i.g. while being irradiated with a 450 watt mercury light. In brief, the body of the reactor was fabricated from a three-inch diameter stainless steel tube, approximately six inches long. To admit the ultra-violet light, a 33 mm. I.D. quartz tube was sealed into both ends of the reactor so that the reaction solution could be contained in the annular space between the quartz tube and the inside of the stainless steel pipe. The reactor was equipped with a pressure gauge, a thermowell and a cooling coil through which tap water flowed. Inlet tubes wtih valves were provided in order to charge the reactants. The charged reactor was fastened on a shaker, a lighted 450 watt mercury lamp inserted in the quartz tube, and the shaker started. At the end of the irradiation period, the unreacted hydrogen sulfide was bled off and the liquid phase was distilled to yield 45 g. (0.26 mole) 3-pinyl mercaptan. The mercaptan boiled at 119° to 120° C. at 23 mm. mercury pressure and had a refractive index of 1.5119.

Example II.—Preparation of 3-Chloropropyl and Propyl Pinyl Sulfides

Runs were made to prepare propyl pinyl and chloropropyl pinyl sulfides. In each of the runs, the process and apparatus was essentially the same. The apparatus consisted of a 1-liter, 3-necked flask equipped with a stirrer. When using 1-bromo-3-chloropropane as a reactant, the pinyl mercaptan, the 1-bromo-3-chloropropane and the methanol were charged to the flask and aqueous sodium hydroxide was added dropwise to the mixture while the mixture was refluxing. Sodium bromide, formed by the reaction, precipitated out in the flask and was later dissolved in water, leaving the oil phase which was distilled to give the 3-chloropropyl 3-pinyl sulfide. When using n-propyl bromide the pinyl mercaptan, methanol and solid sodium hydroxide were charged to the flask and the n-propyl bromide was added dropwise to the refluxing mixture. The precipitated sodium bromide was separated from the mixture by washing with water and the oil phase was distilled to give n-propyl pinyl sulfide. Table I shows summarized data from typical runs in the preparation of these pinyl sulfides.

TABLE I

| Mercaptan charge | Methanol charge | Halide charge | NaOH charge | Sulfide recovered |
|---|---|---|---|---|
| 3-pinyl mercaptan 85 g. (0.5 mole) | 150 cc | 1-bromo 3-chloropropane 78.8 g. (0.5 mole) | 50 g. (40% aqueous) | 3-chloropropyl 3-pinyl sulfide 110 g. (0.45 mole) |
| 2-pinyl mercaptan 170 g. (1 mole) | 300 cc | 1-bromo 3-chloropropane 157.5 g. (1 mole) | 105 g. (40% aqueous) | 3-chloropropyl 2-pinyl sulfide 200 g. (0.81 mole) |
| 2-pinyl mercaptan 101 g. (0.59 mole) | 180 cc | n-Propyl bromide 75 g. (0.61 mole) | 26 g | n-Propyl 2-pinyl sulfide 110 g. (0.52 mole) |

*Example III.—Preparation of Propyl and Chloropropyl Pinyl Sulfoxides*

Runs were made in which propyl pinyl and chloropropyl pinyl sulfides were oxidized to the corresponding sulfoxides, with the use of hydrogen peroxide. The oxidation was carried out in a 3-necked flask, fitted with a stirrer, a reflux condenser and a dropping funnel. In typical runs, the desired sulfide and methanol solvent were charged to the flask and heated to reflux. Then the aqueous hydrogen peroxide was added over a 20 minute period. During the addition of the hydrogen peroxide, the reaction mixture refluxed vigorously. After all the hydrogen peroxide had been added, the solution was allowed to stand at least two hours to complete the oxidation. Then, about 500 cc. of water was added to precipitate the sulfoxide product as a second liquid phase. This liquid phase was then separated and the methanol, unreacted sulfide and unreacted hydrogen peroxide were stripped off, leaving the sulfoxide product. Summarized data for typical runs in the oxidation of the propyl pinyl and chloropropyl pinyl sulfides to the corresponding sulfoxides are shown in Table II.

TABLE II

| Sulfide | Hydrogen peroxide | Methanol | Sulfoxide recovered |
|---|---|---|---|
| 3-chloropropyl 3-pinyl sulfide 61.6 g. (0.25 mole) | 28.3 g., 30% aqueous (0.25 mole) | 75 cc | 3-chloropropyl 3-pinyl sulfoxide 62.9 g. (0.24 mole) |
| 3-chloropropyl 2-pinyl sulfide 100 g. (0.41 mole) | 46 g., 30% aqueous (0.41 mole) | 120 cc | 3-chloropropyl 2-pinyl sulfoxide 98.8 g. (0.38 mole) |
| n-Propyl 2-pinyl sulfide 60 g. (0.28 mole) | 32.5 g., 30% aqueous (0.28 mole) | 85 cc | n-Propyl 2-pinyl sulfoxide |

*Example IV*

A number of runs were made in which the insect repellent compositions of this invention were tested to determine their repellency to houseflies, *Musca domestica*. The repellency to houseflies was determined by the Sandwich Bait method which is essentially that disclosed by L. B. Kilgore in "Soap," June 1949. The testing procedure involved the application of two thin strips of molasses about ¼" wide and 3½" long to a sheet of cardboard, leaving a margin of at least ½" all around and a space of at least 1½" between the strips. The prepared cardboard strips were then ovendried at 45° C. Strips of highly porous lens paper, 1" by 5" in dimension, were impregnated with the repellent to be tested by immersing them in an acetone solution containing the desired quantity of the chemical to be tested, and then allowing the strips to dry over a period of 2 to 3 hours. An impregnated strip was then superimposed on each strip of molasses and was fastened in place by stapling it to the cardboard backing. The prepared strips were then exposed to about 150 houseflies, over 5 days old, which had been starved for 6 hours. The number of flies feeding on the molasses strips are recorded after 5 and 15 minutes, and each 15 minutes thereafter for 165 minutes. The results of these tests are tabulated in Table III. For comparison purposes, the flies will completely consume the molasses in 15 to 30 minutes, and sometimes in as short a time as 5 minutes, when the material is non-repellent or when no repellent has been applied to the lens paper.

TABLE III

| Compound [1] and percent of compound in solution | Number of flies feeding at indicated time in minutes | | | | | | | | | | | | Estimated weight percent of molasses remaining after starving flies overnight |
|---|---|---|---|---|---|---|---|---|---|---|---|---|---|
| | 5 | 15 | 30 | 45 | 60 | 75 | 90 | 105 | 120 | 135 | 160 | 165 | |
| A, 0.25 | 0 | 0 | 0 | 0 | 0 | 0 | 0 | 0 | 0 | 0 | 0 | 0 | 97 |
| A, 0.50 | 0 | 0 | 0 | 0 | 0 | 0 | 0 | 0 | 0 | 0 | 0 | 0 | 99 |
| A, 1.00 | 0 | 0 | 0 | 0 | 0 | 0 | 0 | 0 | 0 | 0 | 0 | 0 | 100 |
| B, 0.50 | 0 | 0 | 0 | 3 | 6 | 2 | 4 | 5 | 2 | 2 | [2] Gone | | 0 |
| B, 1.00 | 0 | 0 | 0 | 0 | 0 | 0 | 0 | 0 | 1 | 1 | 1 | 0 | |
| C, 0.50 | 0 | 0 | 0 | 1 | 2 | 5 | 2 | 3 | 2 | 5 | 1 | 2 | 0 |
| C, 1.00 | 0 | 1 | 0 | 0 | 0 | 0 | 0 | 0 | 0 | 0 | 0 | 0 | [3] 0 |

[1] Compound A—3-chloropropyl 3-pinyl sulfoxide; Compound B—3-chloropropyl 2-pinyl sulfoxide; Compound C—n-propyl 2-pinyl sulfoxide.
[2] Molasses completely consumed.
[3] The molasses was consumed during the time period between the end of the 165 minute check and the next morning.

*Example V*

Several runs were made in which the insect repellent compositions of this invention were tested as repellents for the stable fly, *Stomoxys calcitrans*. The flies were reared according to the method reported by Campau, Baker and Morrison in "Journal of Economic Entomology," 46, 524 (1953). In these tests, organdy bags were fabricated from a sheet of organdy 10" square so that one end of the bag was opened. The organdy bags were then impregnated with 1 gram of the chemical to be tested dissolved in 6 or 7 milliliters of acetone and were suspended on a line to dry. After 24 hours, the bags were drawn over the hand and exposed to several thousand hungry stable flies confined in a 30" cubical cage. The time to the first bite was recorded, and if no bites were sustained in 5 minutes, the bag was withdrawn and the procedure repeated the following day. If a bite was received, the flies were shaken off the bag and the bag was kept in the cage until either no bites were received in a five minute period or until two additional bites were received, in which case the time in seconds to each of the second and third bites was recorded. The period of effective repellency was recorded as the number of days from the day the bags were impregnated to the day when the flies bit constantly. Random bites were not considered to show a loss of effective repellency. The results of these tests are expressed below as Table IV. If a material is non-repellent, or if an untreated bag is employed, the flies bite immediately (less than 5 seconds) upon inserting the hand into the cage.

TABLE IV

| Repellent used [1] | Seconds to 1st, 2nd and 3rd bites on indicated days | | | |
|---|---|---|---|---|
| | 1 day | 2 days | 3 days | 4 days |
| 3-chloropropyl 3-pinyl sulfoxide | 210, 200, NB [2] | 50, 61, 42 | | |
| 3-chloropropyl 2-pinyl sulfoxide | NB | 180, NB | 150, 15, NB | 25, 5, 10. |
| n-propyl 2-pinyl sulfoxide | NB | 160, NB | 180, NB | 45, 15, 7. |

[1] 1 gram impregnated in each bag.
[2] NB indicates no bites were received.

Reasonable variation and modification are possible within the scope of the foregoing disclosure and the appended claims to the invention, the essence of which is that there have been provided a new insect combatting agent consisting essentially of at least one of the sulfoxides herein defined and a method for repelling insects with at least one such sulfoxide.

We claim:
1. A method of combatting an insect which comprises subjecting said insect to an effective amount of a compound selected from the group consisting of sulfoxides of the formulas

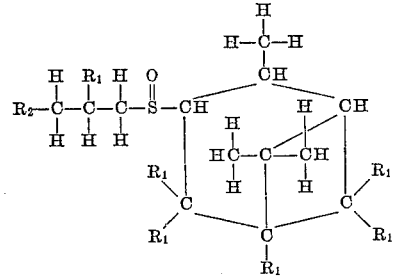

and

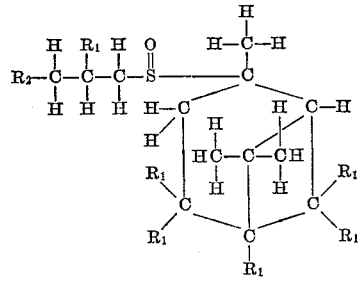

wherein $R_1$ is selected from the group consisting of hydrogen and methyl, and $R_2$ is selected from the group consisting of hydrogen and chlorine.

2. A method of combatting an insect which comprises subjecting said insect to the action of a compound of claim 1.

3. A method of rendering an animal repellent to flies which comprises applying to said animal an effective quantity of a compound of claim 1.

4. A method of repelling a fly which comprises subjecting said fly to the action of a compound of claim 1.

5. A method of repelling a house fly which comprises subjecting said house fly to the action of a compound of claim 1.

6. A method of repelling a stable fly which comprises subjecting said stable fly to the action of a compound of claim 1.

7. A method of repelling an insect which comprises subjecting said insect to at least one compound selected from the group consisting of sulfoxides of the formulas

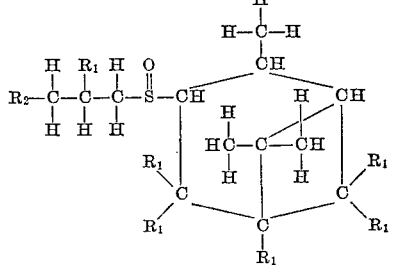

and

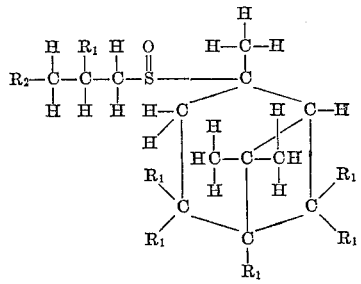

wherein $R_1$ is selected from the group consisting of hydrogen and methyl, and $R_2$ is selected from the group consisting of hydrogen and chlorine.

8. A method of repelling a fly which comprises subjecting said fly to the action of an effective amount of a compound of claim 7.

9. A method of repelling a fly which comprises subjecting said fly to the action of an effective amount of 3-chloropropyl 3-pinyl sulfoxide.

10. A method of repelling a fly which comprises subjecting said fly to the action of an effective amount of 3-chloroproyl 2-pinyl sulfoxide.

11. A method of repelling a fly which comprises subjecting said fly to the action of an effective amount of n-propyl 2-pinyl sulfoxide.

References Cited in the file of this patent
UNITED STATES PATENTS
2,875,123    Wygant _____ Feb. 24, 1959